Aug. 25, 1931.     A. Z. GATEWOOD     1,820,793
WHEEL TIGHTENER
Filed Nov. 1, 1930     2 Sheets-Sheet 1
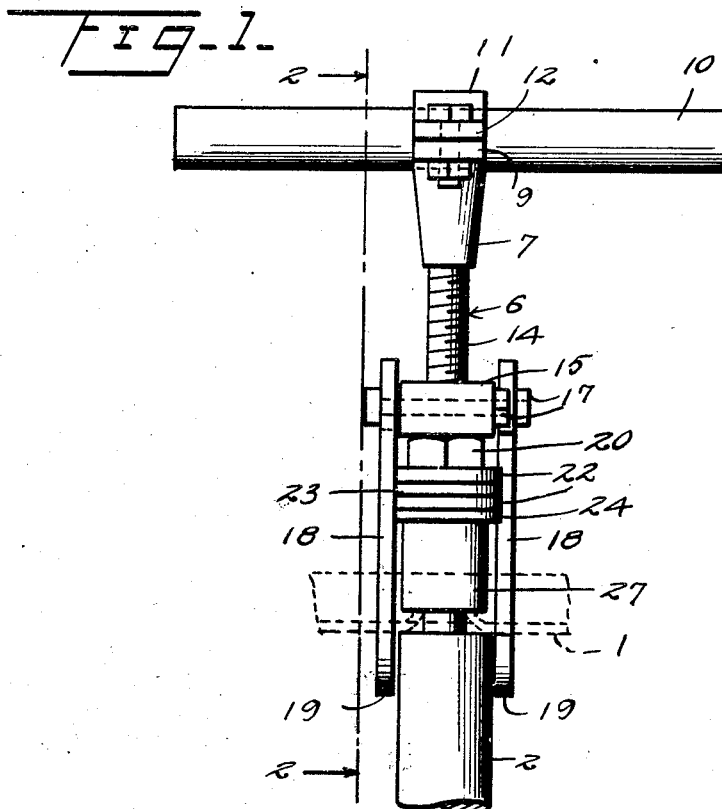
Fig. 1.
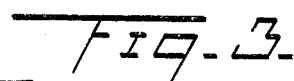
Fig. 3.
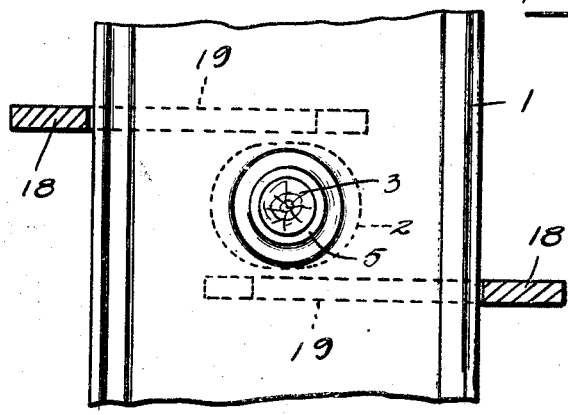
Inventor
A. Z. Gatewood
By Watson E. Coleman
Attorney

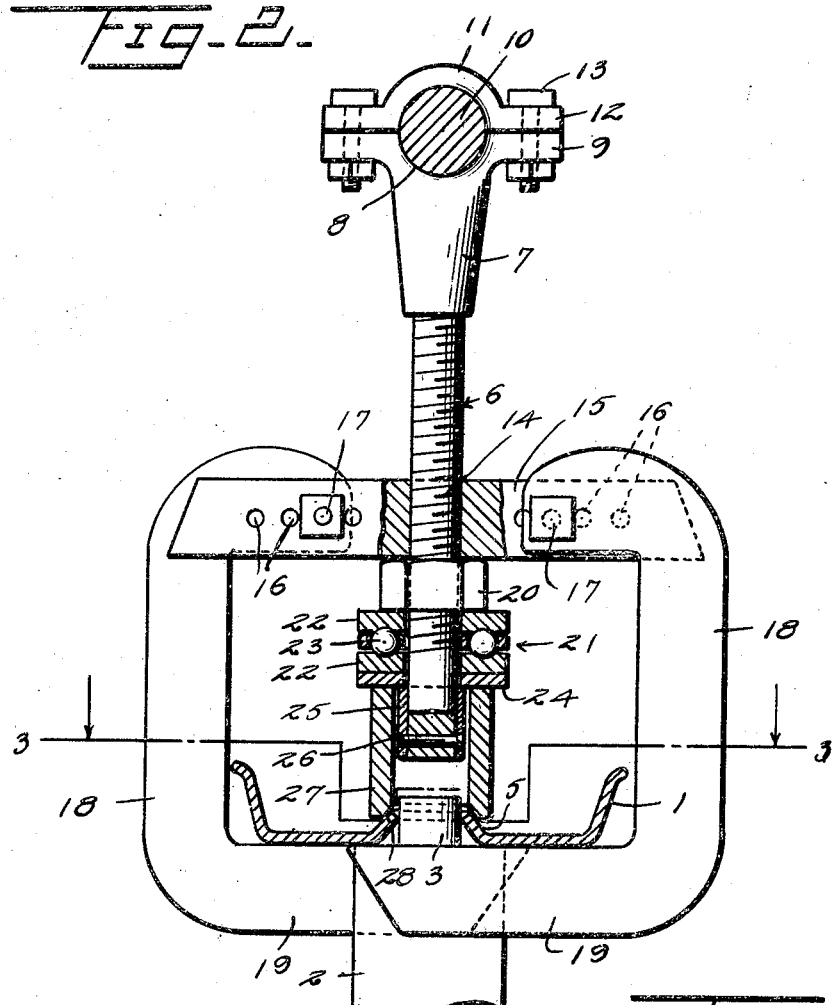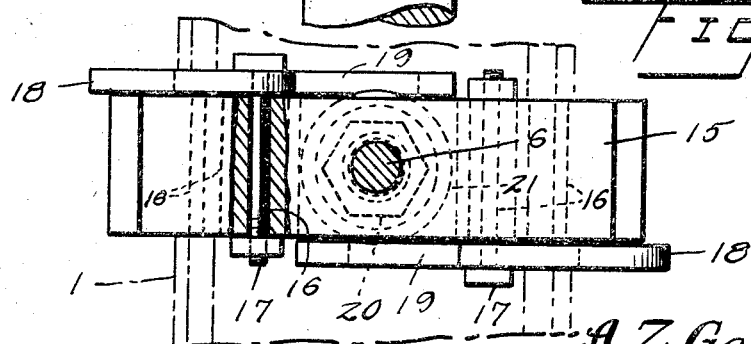

Patented Aug. 25, 1931

1,820,793

UNITED STATES PATENT OFFICE

ANDO Z. GATEWOOD, OF TEMPLE, OKLAHOMA

WHEEL TIGHTENER

Application filed November 1, 1930. Serial No. 492,848.

This invention relates to improvements in devices for tightening up wheels, particularly motor vehicle wheels of the type having an iron felloe.

The primary object of the present invention is to provide a tool by means of which the connection between the felloe of a wheel and the tenon which passes through the wheel, may be easily and quickly tightened and the felloe swaged down against the ends of the wheel spokes and the spokes tightened in the wheel hub, without having to remove the wheel from the axle.

Another object of the invention is to provide a tool which is of simple construction, strong and durable and easy to operate.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Fig. 1 is a view in side elevation of the tool embodying the present invention,

Fig. 2 is a sectional view taken substantially on the line 2—2 of Fig. 1,

Fig. 3 is a sectional view taken upon the line 3—3 of Fig. 2, and

Fig. 4 is a view in top plan of the tool, the shaft thereof being in cross-section.

Referring more particularly to the drawings wherein like numerals of reference indicate corresponding parts throughout the several views, the numeral 1 indicates the metal felloe of a motor vehicle wheel which is carried by the wheel spokes, one of which is indicated by the numeral 2, each of which spokes has a tenon 3 on its outer end which passes through an aperture of the felloe, the edge of which aperture is turned up slightly forming the flange 5 which surrounds and, when the wheel is originally assembled, is pressed against the tenon to grip the same and thus form a tight joint between the spoke and the felloe. This connection between the spoke tenon and the flange of the felloe becomes loosened and thus causes the wheel to become noisy.

The tool embodying the present invention comprises a screw shaft 6, one end of which is formed to provide the head 7 having a recess 8 transversely thereof and the ears 9 extending from each side of the recess. A handle 10 is secured in the recess 8 of the head and is held in place by the cap 11, the extended sides 12 of which are secured to the ears 9 by bolts 13.

The shaft 6 is provided intermediate its ends with screw-threads 14 and this threaded portion extends through and is in threaded connection with a yoke bar 15, the passage through which the screw shaft passes being midway between the ends of the bar as shown.

Adjacent each end the bar is provided with a longitudinally extending series of transverse apertures 16, through one of which is passed a bolt 17 which also passes through one end of a pull arm 18 and supports the same as illustrated. Each of the arms 18 is formed at its other end to provide the hook 19 which is designed to engage beneath the wheel felloe 1.

The downward movement of the bar 15 upon the shaft 6 is limited by an adjusting nut 20 which is in threaded engagement with the shaft beneath the bar. Beneath the nut 20 is an antifriction element which is indicated generally by the numeral 21 and which comprises a pair of bearing-ball races 22 between which bearing balls 23 are positioned. A washer 24 surrounds the shaft beneath the bearing element and this, with the bearing element, is held on the shaft by a sleeve 25 placed over the lower end thereof and held in position by a screw 26 or by any other suitable means in the manner shown.

When the tool is in use there is used with it a nipple or sleeve 27, each tool being provided with a number of these sleeves or nipples of different sizes. Each sleeve 27 is of a size to receive a spoke tenon 3 of a given diameter and each is beveled as indicated at 28, at one end and upon its inner edge.

In operation the pressure-applying nipple or sleeve 27 is disposed over the spoke tenon 3 with the beveled inner edge or shoulder 28 engaging the upturned edge of the aperture through which the tenon passes. The lower end of the shaft 6 is then inserted in the upper end of the nipple 27 and the inturned ends 19 of the arms 18 are engaged beneath the felloe upon opposite sides of the spoke, the bar 15, of course, extending across the felloe in the manner shown.

The handle 10 is then turned to rotate the shaft 6 so that it will move downwardly and exert pressure upon the sleeve 27 as a result of the force opposing its downward movement through the bar 15 and arms 18 which are connected with the felloe. This results in the shoulder 28 of the pressure applying sleeve exerting great pressure upon the edge of the aperture through which the tenon passes so that this edge will be bent down and caused to firmly grip the tenon. Due to the bearing 21 interposed between the bar 15 and the sleeve 27, the turning of the shaft is made easy so that the tool may be used a great deal without tiring the user.

At the same time that the sleeve 27 is operating to force the flange 5 downwardly into gripping engagement with the spoke tenon, the tool will operate, due to the spaced engagement of the portions 19 of the arms 18 with the felloe and the central engagement of the sleeve 27 therewith, to flex the felloe sufficiently to force it down firmly against the shoulder of the spoke 2 and this will at the same time force the other end of the spoke adjacent the tool firmly into its socket in the wheel hub.

Having thus described my invention, what I claim is:—

1. A spoke tightening device for vehicle wheels having a felloe and spokes each having a tenon extending through the felloe, comprising a shaft, a sleeve member adapted to position on the felloe around a spoke tenon, a bar having said shaft threadably extended therethrough, arm members carried by said bar and formed to engage over opposite edges of the felloe, an antifriction element surrounding the shaft and interposed between the bar and said sleeve, and means for limiting the movement of the bar on the shaft, said arms being adjustable longitudinally of the bar.

2. A spoke tightener for wheels having a metal felloe surrounding spokes each having a tenon extending through an aperture in the felloe, the edge of the aperture surrounding each tenon being turned to form a flange, comprising a shaft, a sleeve designed to position against a flange and receive a tenon, a bar having said shaft extending therethrough and having threaded connection with the shaft, a movement limiting nut for the bar threaded onto said shaft beneath the bar, an antifriction element surrounding the shaft beneath said nut, said sleeve receiving the end of the shaft adjacent the antifriction element and having the antifriction element bearing thereagainst, a sleeve secured on the shaft and retaining the antifriction element in position thereon, arms carried by said bar adapted to engage the felloe over the edges thereof, and means for rotating said shaft.

In testimony whereof I hereunto affix my signature.

ANDO Z. GATEWOOD.